Nov. 16, 1937.  J. M. RICHARDS  2,099,534
SKYLIGHT OR FLOORLIGHT CONSTRUCTION
Filed Feb. 4, 1936  2 Sheets-Sheet 1
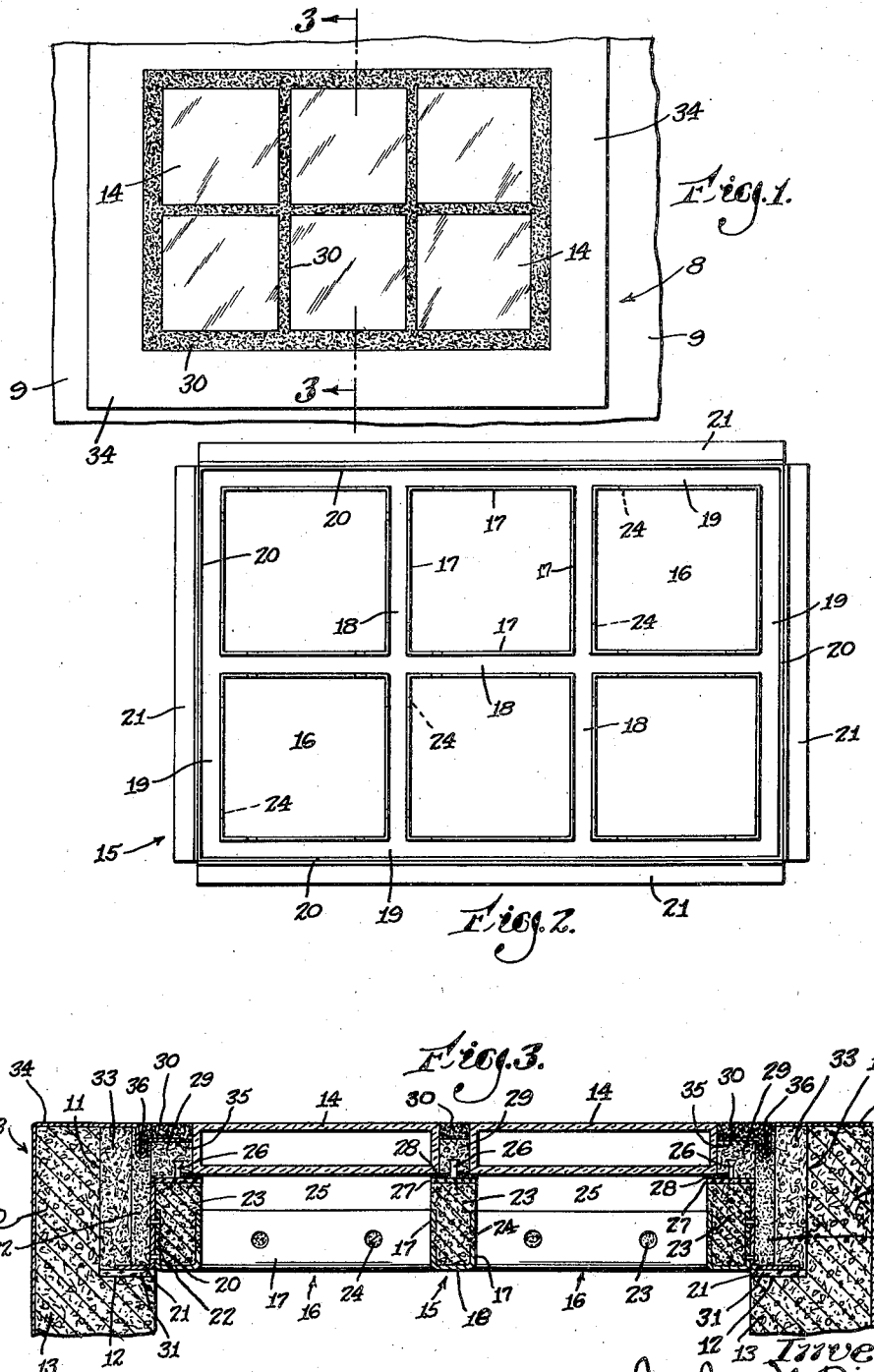

Nov. 16, 1937.  J. M. RICHARDS  2,099,534
SKYLIGHT OR FLOORLIGHT CONSTRUCTION
Filed Feb. 4, 1936    2 Sheets-Sheet 2

Inventor
Joshua M. Richards
by Charles W. McDermott
his Attorney

Patented Nov. 16, 1937

2,099,534

UNITED STATES PATENT OFFICE 2,099,534

SKYLIGHT OR FLOORLIGHT CONSTRUCTION

Joshua M. Richards, Brookline, Mass.

Application February 4, 1936, Serial No. 62,303

17 Claims. (Cl. 108—16)

The present invention relates to skylight and floorlight constructions, or the like.

It is well known that moisture from the air will condense on one surface of a material which has a relatively high thermal conductivity if the other surface of the material is at a colder temperature. This moisture condensation varies in amount, increasing with an increase in the amount of moisture in the air, or with an increase in the difference between the two temperatures at the opposite surfaces of the material, or with both. The degree of thermal conductivity possessed by the material itself is also an important factor.

This phenomenon of moisture condensation has presented a major problem in making skylight or floorlight or like installations. In the various types of strictly metal and glass constructions gutters are necessary for carrying away the moisture condensed. In flat type glass and concrete constructions used heretofore condensation occurs unless ventilation is provided to eliminate dead air pockets. If a material such as metal, which has a very high thermal conductivity, runs through the entire thickness of the construction, condensation of moisture occurs readily. This is true both when the framework is metal and when metallic shields, set in concrete, are exposed at the opposite surfaces of the construction. However, if the metal used, be it framework or shields, is not exposed at the opposite surfaces of the construction, but is insulated from at least one of said surfaces, condensation of moisture will be eliminated or greatly diminished. It will be apparent that the surface from which the metal should be primarily insulated is the outside surface, that is, the surface exposed to cold. It will also be apparent that such a thermally insulated construction, in addition to its effect in preventing condensation of moisture from the air, also prevents heat losses in winter from the building in which the construction is used and excludes undesirable heat in summer. Moreover, with the increasing use of air conditioning in buildings generally, air tight constructions are necessary if the air conditioning means is to function properly. Since strictly metal and glass installations are not air tight and since glass and concrete constructions made heretofore require ventilation, they are not satisfactory for use with air conditioning.

It is the principal object of the present invention to provide installations suitable for use as skylights, floorlights, or the like such that the condensation thereon of moisture from the air is prevented or greatly diminished, which obviate the need for gutters to carry away condensed moisture or ventilation to prevent it, which are air tight and watertight, and which prevent heat losses in winter and exclude the admission of heat in summer.

To the accomplishment of these objects and such others as may appear hereinafter, the various features of the present invention reside in certain devices, constructions, combinations, and arrangements of parts fully set forth hereinafter and then pointed out in the appended claims.

The various features of the present invention will be readily understood from an inspection of the accompanying drawings, illustrating the best forms of the invention at present known to the inventor, in which, Figure 1 is a view in plan of one form of the present invention;

Fig. 2 is an enlarged view in plan of the metallic frame used in the Fig. 1 construction;

Fig. 3 is an enlarged view in sectional elevation taken along the line 3—3, of Fig. 1;

Figure 4:
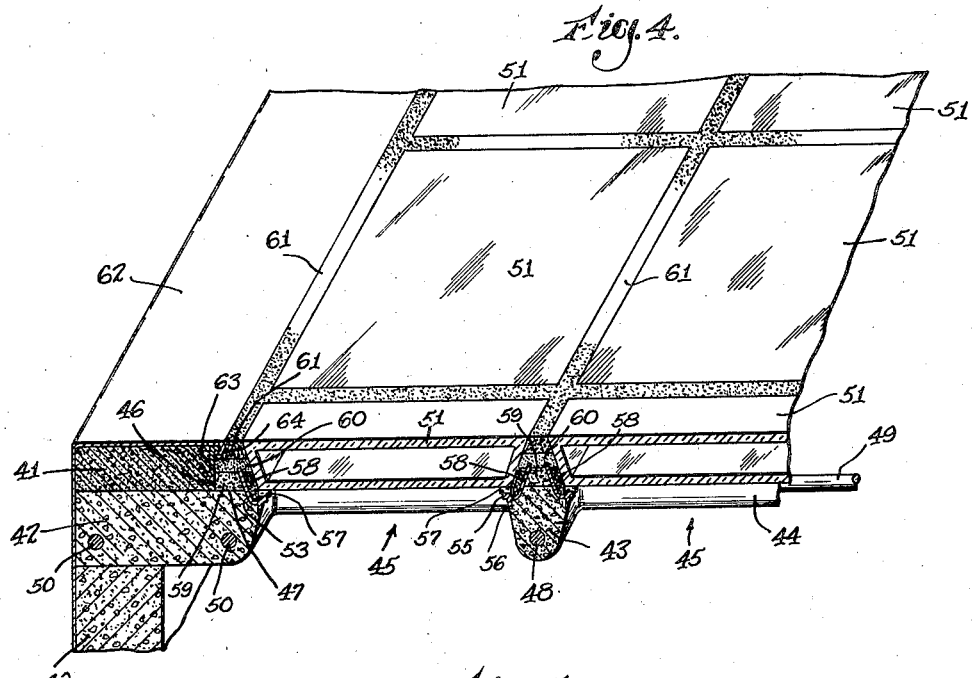
Fig. 4 is a detail view in perspective, partially in section, of a modified form of the present invention employing light transmitting elements having slanting sides in connection with a reinforced concrete grid.

The embodiment of the invention illustrated in Figs. 1, 2, and 3 is installed within the opening formed by a concrete curbing 8 rising from a roof 9 and extending around a light transmitting opening formed in the roof. The roof may be of any construction suitable for use with the curbing 8, and need not be further described since the roof proper, as opposed to the superstructure resting on it, forms no part of the present invention. The curbing 8 shown in Fig. 3 comprises a border portion 10 provided with a vertical inner wall 11 and a horizontal shoulder 12 extending inwardly from the base of the wall 11 to form the top of a bearing portion 13. The curbing 8 may be square or rectangular or any desired shape. In Figs. 1 and 3 the curbing 8 is rectangular, so that the inner walls of the bearing portion 13 define a rectangle substantially the size of the opening in the roof 9, and the vertical border walls 11 define a rectangle slightly larger.

The curbing superstructure shown in Fig. 3 is designed to support a rectangular grid which in turn supports a plurality of light transmitting elements herein shown merely for purpose of disclosure as being hollow blocks of glass 14 which are six in number. The support for the glass blocks 14 is formed initially by providing a metallic framework for the reception of material to form a grid.

Referring to Figs. 2 and 3, the metallic framework, indicated generally at 15, is formed by constructing sheet metal, for example, into a grid which defines six spaced apertures 16 each of which is surrounded by a vertical wall 17 forming a wing of a U-shaped channel the web 18 of which is the material between adjacent apertures 16. Peripherally the construction described is surrounded at its base by a web 19 from the outer edge of which rises a peripheral wall 20 to the height of the walls 17. The apertures 16 defined by the walls 17 are slightly smaller than the bottom faces of the glass blocks 14, as shown in Fig. 3, and the rectangle formed by the peripheral wall 20 just overlies the opening formed by the inner walls of the bearing portion 13.

In order to support the framework 15 over this last named opening, L-shaped brackets 21 are associated with the peripheral wall 20. As shown in Fig. 3, the vertical arm of each bracket 21 is secured, as by rivets 22, to the outer face of the wall 20 and extends upwardly above the wall 20. The horizontal arm of each bracket 21 lies in the plane of the webs 18 and 19 and extends outwardly from the framework 15 in a position to overlie the greater portion of the horizontal bearing shoulder 12.

The metallic famework 15 forms a support for a solid grid 23, the lower portion of which fills the channels of the framework 15 and the upper portion of which rises above the tops of the walls 17 and 20. To this end, the channels are provided with some suitable solid material of low thermal conductivity. Any suitable material may be used to form the grid 23, aerated concrete or concrete containing insulating aggregates being but two examples, and the two essential characteristics of the material being that it should be cohesive enough to perform its supporting function and should have high insulating properties. In forming the solid material to form the grid 23, flat members may be placed against the outer faces of the walls 17, i. e., within the apertures 16, and the material poured to a suitable height above the framework 15. For reasons which will appear below, the upper surface of the grid 23 is preferably spaced above the top of the framework 15. By having the vertical arms of the brackets 21 extend upwardly to the level intended for the top of the grid 23, these bracket arms function as mold pieces along the outer edge of the grid 23 as the material thereof is being poured. In order to lock the grid 23 in the framework 15, the walls 17 and 20 may be provided with openings 24 which the solid material 23 enters in being poured and engages the mold members or the vertical arm of the brackets 21, as the case may be.

In the construction so far described, there is thus provided a solid grid 23 having low thermal conductivity and resting in a metallic framework. By reason of the insulating properties of the grid 23 and the spacing of its top from the top of the framework 15, anything resting on the top of the grid 23 is heat insulated from the metal of the framework 15. The grid 23 is provided with six apertures 25 continuous with the apertures 16 formed by the walls 17.

The grid 23 is adapted to receive light transmitting elements over its apertures 25. As stated above, these elements are herein shown as comprising hollow blocks of glass 14, but these elements may be sheets of glass spaced apart and sealed at the edges or they may be hollow glass tiles or any suitable construction which transmits light and has insulating properties. The hollow varieties preferably contain desiccated air or rarified air or gases having insulating properties, the basic idea being to produce a light transmitting element the thermal conductivity of which, taken as a whole, is relatively low as compared to the thermal conductivity of ordinary skylight or floorlight glass as used in single sheets or multiple glazing.

The blocks of glass 14 being slightly larger than the apertures 25, as shown in Fig. 3, the margins of the bottom faces of the blocks overlie the margins of the apertures 25. The blocks 14 are received by shields 26 herein shown as vertical pins having flaring ends which are embedded in the grid 23 and may extend in spaced relationship about the blocks 14. With this particular construction, the pins 26 are located between the adjacent sides of adjacent blocks 14 and also extend peripherally around the blocks as a whole. As shown in Fig. 3 the tops of the shields formed by the pins 26 are on a level well below the tops of the blocks, and the pins 26 are spaced from the blocks and from the walls 17 and 20.

Although the blocks 14 overlie the grid apertures 25, the blocks do not rest directly upon the grid but are insulated therefrom. To this end any suitable thermal insulating material 27, such as sheet cork, for example, is placed on the top of the grid 23, the material preferably extending across the grid between the adjacent sides of adjacent apertures 25 and also peripherally around the top of the grid. Resting on the top of the insulating material 27 is a mastic bedding 28 in which the glass blocks 14 are set. This bedding 28 preferably covers the insulating material between adjacent apertures 25, but need not extend beyond the pins 26 embedded in the peripheral portion of the grid 23. The pins 26 extend above the insulating material 27 and the mastic bedding 28. In assembling the blocks 14 with the grid 23, the blocks are placed within the shields formed by the pins 26 and are pressed down slightly into the bedding 28. When placed in position, the tops of the blocks 14 line in a plane.

In order to secure the blocks 14 firmly in place and to provide for greater insulation in the construction above described, the spaces between adjacent blocks 14, as shown at the center of Fig. 3 for example, are filled in with a relatively soft insulating material 29 of low thermal conductivity. As shown in Fig. 3 this insulating material 29 covers the bedding 28, fills in the spaces between the pins 26 and the blocks 14, extends between the adjacent sides of adjacent blocks 14 in engagement with each, and rises upwardly to a level below the tops of the blocks 14, but well above the tops of the pins 26. The material 29 may be any material suitable for the purpose, the prime requisites being that it be relatively soft, since it engages the blocks 14, and that it have a low thermal conductivity so as to have insulating properties.

Covering the relatively soft insulating material 29 in engagement with adjacent sides of adjacent blocks 14 is a suitable sealing compound 30, such as the waterproof and slightly elastic compound formed of tar and sulphur, the top of which terminates in the plane of the tops of the blocks 14.

As a matter of assembly operation, the blocks 14 and the grid 23 are assembled before being placed in the opening formed by the inner walls of the bearing portion 13 of the curbing, and at this same time the insulating material 29 and the sealing compound 30 may be added. In pouring the insulating material 29, suitable flat members may be placed against the outer faces of the vertical arms of the brackets 21 and these flat members extend upwardly to the level that the top of the material 29 is to have. By this arrangement, the material 29 extending peripherally around the blocks 14 considered together is poured at the same time the material 29 is poured as described above into the space between adjacent sides of adjacent blocks. As shown in Fig. 3, the peripheral insulating material 29 engages the blocks 14, fills in the spaces between the pins 26 and the blocks, covers the bedding 28 and the pins 26, and terminates outwardly in a vertical wall forming a continuation of the vertical arms of the brackets 21.

The unit described above is then inserted into the opening defined by the border walls 11 of the curbing 8, the horizontal arms of the brackets 21 preferably resting on suitable insulating material 31 which in turn rests upon the horizontal shoulder 12 of the bearing portion 13.

It will be noted that this arrangement leaves a gap between the periphery of the grid and block unit and the border walls 11. This gap is filled in with some suitable elastic material 32 which is relatively soft and has low thermal conductivity, and with further insulating material 33 which may be harder than the material 32. The material 33 may be cork if desired. Both the materials 32 and 33 have insulating properties, and in addition, the material 32, by reason of its softness acts as an expansion joint to compensate for the effects of temperature changes upon the metallic framework 15. As shown in Fig. 3, the relatively soft material 32 engages the insulating material 29 and the vertical arm of the brackets 21, and the insulating material 33 engages the border wall 11 and the material 32. With this construction it will be seen that the border 10 proper and the insulating materials 32 and 33 together form, in effect, a continuous border surrounding the grid and engaging the grid and block unit, the inner vertical face of the material 32 forming a wall from which the top of the grid extends inwardly as a shoulder.

In skylight constructions it is generally desirable to cover the curbing outside the lighting area with a suitable flashing. This general construction is old and well understood, and is shown in Figs. 1 and 3 as comprising sheet material 34 extending over the top and sides of the curbing 8. Referring to Fig. 3, one end portion 35 of the flashing rests on top of the peripheral insulating material 29 spaced from the adjacent blocks 14, and extends outwardly over the outer edge of the material 29. From this point the flashing 34 extends downwardly into the material 32 and then upwardly to form a channel 36, the outer wall of which extends upwardly to the level of the top of the border 10 and then extends outwardly along the material 33 and the border 10 and then downwardly along the outer wall of the curbing. When the flashing 34 is in place, the relatively soft insulating material 29 exposed between the blocks 14 and the flashing 34 is covered with sealing compound 30. The flashing portion 35 is also covered with compound 30 and the channel 36 is filled with compound 30. Like the compound 30 located between the adjacent sides of adjacent blocks 14, the compound 30 overlying the peripheral insulating material 29 and the flashing terminates upwardly in the plane of the tops of the blocks 14.

The shields described above have been shown merely for purposes of disclosure as comprising pins 26 having flaring ends. It should be pointed out that it is not essential that the shields be formed in this particular way. An equally satisfactory way of making shields is that disclosed in my Patent No. 2,030,718, issued February 11, 1936 and illustrated in Figs. 3, 4, 5, and 6 thereof. It should also be pointed out that the particular manner disclosed above for supporting the frame 15 on the curbing 13 is also not essential. It may be in some jobs that the preferred way to support the frame 15 would be to make the frame slightly wider and longer than the opening defined by the inner walls of the bearing portion 13, thus causing the bottom margins of the frame 15 to overlie the margins of the shoulder 12. With this construction the brackets 21 are unnecessary. This last manner of support is preferable in using the above described construction for floorlight purposes, in which case the frame 15 would overlie a flooring support, the flashing would be dispensed with, and the top of the border 10 would be in the plane of the top of the surrounding flooring.

In view of the above description, it will be seen that insulation is provided through the thickness of the construction such as to minimize or prevent the condensation of moisture on the under portion thereof. Stated in another way, the above construction is so insulated as to offset the effect of the difference between the temperatures of its top and bottom surfaces. The light transmitting elements 14 themselves have insulating properties, their construction giving them a relatively low thermal conductivity as compared to that of ordinary single sheets of glass commonly used. Since the grid 23 is made of solid material having low thermal conductivity, the fact that the upper surface of the grid is at a level above the metallic walls 17 and 20 of the frame 15 serves to insulate the blocks 14 from the metallic frame 15. Additional insulation in this respect is afforded by the insulating material 27 resting on and covering the entire top surface of the grid 23 and underlying the blocks. As regards the position of the blocks on the grid, the relatively soft insulating material 29 of low thermal conductivity insulates adjacent blocks from each other. The insulating material 29 also insulates the blocks from the shields formed by the pins 26, and since the material 29 covers the pins 26, the pins are insulated vertically from the top of the construction just as they are insulated from the frame 15 by reason of being embedded in the grid 23. The frame 15 is insulated from the bearing shoulder 12 by the insulating material 31 underlying the horizontal arms of the brackets 21. The unit formed by the grid 23 and the frame 15 is insulated from the border 10 by the relatively soft insulating material 32 and the insulating material 33, and the periphery of the blocks 14 taken together is further insulated from the border wall 11 by the insulating material 29 surrounding the blocks and engaged with the insulating material 32. The metal frame 15 is thus insulated from the blocks 14 and from the top surface of the construction, and all metal parts of the grid construction except the frame 15 are covered or surrounded by material having insulating properties. That the flashing 34 is exposed is of no moment. The above construction is airtight and watertight and has, as a whole, a thermal conductivity relatively low as compared to that of the glass and metal or glass and concrete constructions used heretofore.

The construction described above is designed for use with a grid supported on a metallic framework, the unit thus formed being received within the curbing surrounding an opening formed in the roof structure. This construction, by reason of the metallic framework 15, eliminates the need for employing the usual grid made of reinforced concrete which is common in skylight and floorlight constructions. The size of the grid 23 may be of any size suitable, the strength of the material forming the frame 15 being varied accordingly. But there are jobs in which it is desirable to form the covering for the roof or floor opening of reinforced concrete, this being accomplished by resting an apertured slab or grid of reinforced concrete upon the curbing or flooring support and associating light transmitting elements and shields therefor with the apertures. I have shown two such constructions in Figs. 4 and 5, embodying the insulation features of the present invention in constructions adapted for skylight or floorlight purposes formed with a grid framework of reinforced concrete.

Referring to Fig. 4, the reinforced concrete covering rests on a curbing 40 extending upwardly from the roof and surrounding an opening therein. The reinforced concrete covering comprises a peripheral border, having an upper portion 41 and a lower portion 42, which surrounds an apertured portion or area made up of spaced grid members 43 and 44 integral with the border portion 42 and extending transversely and longitudinally thereof so as to define a plurality of apertures 45. Only one run of the border is shown in Fig. 4, it being understood that the other runs are of the same construction. The upper border portion 41 terminates inwardly in a vertical wall 46 from the base of which the lower border portion 42 extends further inwardly to form a horizontal shoulder 47 at the level of the tops of the grid members 43 and 44. The shouldered part of the border portion 42 forms the periphery of the apertured portion of the concrete grid. For strength the grid members 43 and 44 are provided with reinforcing bars or rods 48 and 49, respectively, which terminate within the border portion 42. Each run of the border portion 42 is also provided with reinforcing bars or rods 50, and as shown in Fig. 3, the border portion 42 is adapted to rest on the curbing 40. When this construction is used for floorlight purposes the border portion 42 would rest on a suitable flooring support.

The concrete forming the reinforced lower border portion 42 and the grid members 43 and 44 may be the usual concrete used in reinforced constructions of this type. The concrete forming the upper border portion 41, however, comprises concrete having lower thermal conductivity than the remaining concrete. Stated in another way, the concrete 41 is a thermal insulator, for reasons which will appear infra, and for this purpose may comprise aerated concrete or concrete containing insulating aggregates or the like.

The grid construction shown in Fig. 4 is adapted to support a plurality of light transmitting elements. These are shown in Fig. 4 merely for purposes of disclosure as comprising hollow rectangular blocks of glass 51. The blocks 51 may have any of the constructions indicated above for the light transmitting elements 14, with the single exception that the blocks 51 are trapezoidal in cross section whereas the blocks 14 are rectangular in cross section. As shown in Fig. 4 the smaller bases of the blocks 51 are directed downwardly, so that the sides of the blocks are directed upwardly and outwardly.

Figure 6:
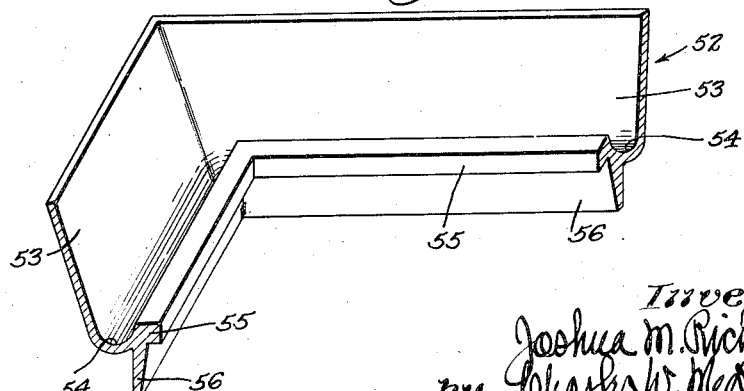
Fig. 6 is a detail view in perspective, partially in section, of one of the shields used for the light transmitting elements of the Fig. 4 construction.

In order to mount the blocks 51 on the concrete grid, the blocks are each individually received by correspondingly shaped protecting shields 52, preferably of non-rusting or galvanized metal, which surround the sides of the blocks 51 and are anchored in the concrete about the apertures 45. As indicated in Fig. 6 each side of the shields 52 comprises a wall 53 having a channel 54 at its bottom from which projects inwardly of the shield a lateral lip 55 having a horizontal top surface. Depending from the lip 55 is a lug 56. The channels 54, the lips 55, and the lugs 56 extend throughout the length of the walls 53 and are joined together at their ends as are the walls 53. Referring to Fig. 4, it will be seen that the shield walls 53 extend upwardly and outwardly at the angularity of the sides of the blocks 51. The shields are embedded in the concrete about the apertures 45 in spaced apart relationship as the concrete is poured, in the finished structure the inner faces of the lips 55 and the lugs 56 being exposed within the openings 45, and the shield walls 53 extending for a little more than half their height above the top of the grids 43 and 44. As regards those portions of the shields which are anchored in the concrete of the shoulder 47, it will be seen in Fig. 4 that the shoulder 47 is of sufficient width so that the walls 53 are spaced from the vertical border wall 46.

Each block 51 is somewhat smaller crosswise and lengthwise than its shield, and the lip 55 is of such size as to underlie the marginal portions of the bottom of a block. In mounting the blocks in the shields, suitable thermal insulating material 57, such as cork, for example, is placed on the top of the lip 55, and the bottom of the block rests on this insulating material. The blocks 51 are secured within their shields by a waterproof and slightly elastic compound 58 which may be tar and sulphur compound like the sealing compound 30. As shown in Fig. 4, the compound 58 fills the shield channels 54, engages the shield walls 53 and the sides of the blocks 51, and terminates upwardly substantially at the level of the tops of the walls 53, and not above them. The relative positions of the blocks 51 and the shields 52 are such that the tops of the shields are at a level about midway between the tops and bottoms of the blocks.

In the construction so far described, the shields 52 are anchored in the grid concrete, and the adjacent walls 53 of adjacent shields are spaced from each other. Since the walls 53 project for a little more than half their height above the grid members 43 and 44, it will be apparent that a channel is formed, bottomed by the grids 43 and 44, between each pair of adjacent walls 53. There is also formed a peripheral channel around the border bounded by its vertical wall 46, the horizontal shoulder 47, and the outer faces of the adjacent shield walls 53. These channels could be filled with any suitable material so far as mere filling alone is concerned, but it is proposed that they be filled with material having high thermal insulating properties. To this end these channels are filled with a suitable solid insulating material 59 of low thermal conductivity which is preferably the same as the solid material of low thermal conductivity of which the upper border portion 41 is formed. The material is poured between the adjacent shield walls 53 and between the border wall 46 and the shield walls adjacent thereto, to the height of the waterproof and elastic compound 58. By reason of this construction the shield walls are insulated from each other, and all portions of the reinforced concrete forming the border portion 42 and the grids 43 and 44 exposed between adjacent shields and between the border wall 46 and shields adjacent thereto are covered by the material 59. By reason of its hardness, the material 59, in addition to affording insulation, serves to anchor the shields 52 more firmly in place.

Were it not for the fact that the glass blocks should not be contacted by hard material, the insulating material 59 could terminate at a level higher than that stated above. But since such accommodation must be made for the glass, further insulation is achieved by filling the spaces between adjacent blocks 51 and between the border wall 46 and the blocks adjacent thereto with a relatively soft insulating material 60 of low thermal conductivity. This material may be the same as the relatively soft material 29 (Fig. 3), that is, any material suitable for the purpose, the prime requisite thereof being that it be soft enough for engagement with the glass and that it have high insulating properties. The material 60 is poured to a level below the tops of the blocks 51, as shown in Fig. 4. With this construction, the material 60 covers the compound 58, the material 59, and the tops of the shields, and extends between the adjacent sides of adjacent blocks 51 and also between the vertical border wall 46 and the block sides adjacent thereto.

Covering the insulating material 60 between adjacent blocks 51 and engaging the blocks is suitable sealing compound 61, which may be like the waterproof and slightly elastic tar and sulphur compound 30. As shown in Fig. 4, the compound 61 terminates upwardly in the plane of the top of the blocks 51.

A suitable flashing 62 may be provided for covering the border portion 41 when the above construction is used for skylight purposes. As shown in Fig. 4, the upper portion 41 is provided with an anchor strip 63 engaging the vertical wall 46. The strip 63 is provided on its lower edge with an inturned flange embedded in the border portion 41 to hold the strip in place and at its upper edge with an outturned flange extending a short distance from the wall 46. An edge portion 64 of the flashing 62 is curled around the outturned flange and the flashing from that point extends along the top of the border portion 41 and down along the outer wall of the border and the curbing 40. The relatively soft insulating material 60 left exposed by the flashing edge portion 64 is covered with sealing compound 61. Like the compound 61 between the adjacent sides of adjacent blocks 51, the compound 61 overlying the peripheral insulating material 60 terminates upwardly in the plane of the tops of the blocks 51.

Considering the insulating features of the above construction as was done above in considering Figs. 1, 2, and 3, the blocks 51, like the blocks 14, have a low thermal conductivity as compared to that of ordinary single sheets of glass commonly used. The blocks 51 are insulated from the horizontal lips 55 of the shields 52 by the insulating material 57. The walls 53 of adjacent shields are insulated from each other by the solid material 59 of low thermal conductivity. The shield tops are covered and adjacent blocks are insulated from each other by the relatively soft material 60 having a low thermal conductivity. The thermal insulation afforded by the upper border portion 41 insulates the lower border portion 42 in the direction of the thickness of the construction and, in cooperation with the insulating materials 59 and 60 provides a peripheral insulation for the sides of the blocks 51 and the shields 52 considered together. No metal in the above construction extends through the thickness thereof, and the construction as a whole is airtight and watertight and has a thermal conductivity relatively low as compared to that of the glass and metal or glass and concrete constructions used heretofore.

The construction described above and illustrated in Fig. 4 is designed to employ light transmitting elements 51 which are trapezoidal in cross section. In view of the fact that blocks of such shape may not be readily available when it is desired to employ a grid construction of reinforced concrete, in Fig. 5 I have shown how light transmitting elements which are rectangular in cross section may be used with such a grid construction.

Figure 5:
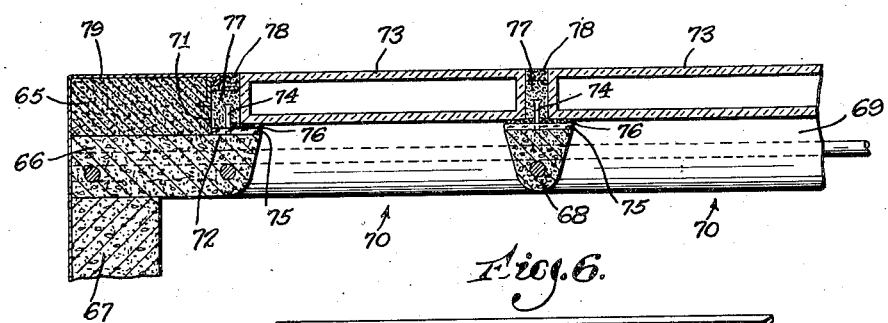
Fig. 5 is a detail view in sectional elevation of a modified form of the present invention employing light transmitting elements having perpendicular sides in connection with a reinforced concrete grid.

Except in one particular the curbing and grid construction shown in Fig. 5 is identical with the corresponding parts shown in Fig. 4. For this reason it is deemed necessary to say merely that the reinforced concrete framework comprises a peripheral border comprising an upper portion 65 and a lower portion 66 resting on a curbing 67 and grid members 68 and 69 which define a plurality of apertures 70. The border portion 65 terminates inwardly in a vertical wall 71, like the wall 46 (Fig. 4), from the base of which the lower border portion 66 extends inwardly to form a horizontal shoulder 72 at the level of the top of the grid members 68 and 69. The one exception noted above distinguishing the grid construction of Fig. 5 from that of Fig. 4 lies in the fact that the top surfaces of the grids 68 and 69 extend across the full width of the grids, whereas this is not the case in Fig. 4 by reason of the shape and position of the shields 52. For the same reason the horizontal shoulder 72 of Fig. 5 is wider than the shoulder 47 of Fig. 4.

The grid construction shown in Fig. 5 is adapted to support a plurality of light transmitting elements which are shown merely for purposes of disclosure as comprising hollow glass blocks 73 which are rectangular in cross section. The blocks 73 may have any of the constructions indicated above for the light transmitting elements 14. The glass blocks 73 are slightly larger than the apertures 70 so that the margins of the bottom faces of the blocks overlie the margins of the apertures. The blocks 73 are received within shields 74 herein shown as vertical pins which may be of the same construction as the pins 26 (Fig. 1) and which are embedded in spaced relationship in the grid members 68 and 69 and the shoulder 72. The shields may also be of the type disclosed in my said Patent No. 2,030,718. As shown in Fig. 5, the pins 74 are spaced from the sides of the blocks 73, and in the case of the shoulder 72 from the vertical wall 71 also. The pins embedded in the shoulder 72 thus extend peripherally around the blocks 73 taken together, and the tops of the pins 74 are on a level well below the tops of the blocks 73.

As in the case of the Fig. 3 construction, the blocks 73 do not rest directly upon the concrete grid, but are insulated therefrom. To this end any suitable insulating material 75, which may be like the insulating material 27, is placed on top of the apertured portion of the grid, the material preferably extending across the grid members 68 and 69 between adjacent apertures 70 and also covering the shoulder 72. Resting on the insulating material 75 is a mastic bedding 76 in which the blocks 73 are set and which may be the same as the mastic bedding 28. The bedding 76 preferably covers the insulating material 75 between adjacent apertures 70, but need not extend beyond the peripheral pins 74 embedded in the shoulder 72.

In order to secure the blocks 73 firmly in place and to provide for greater insulation of the construction as a whole, the spaces between adjacent blocks 73 are filled with a suitable relatively soft insulating material 77 of low thermal conductivity which may be the same as the insulating material 29. This insulating material covers the bedding 76, fills the spaces between the blocks 73 and the pins 74 and covers the latter, extends between the adjacent sides of adjacent blocks in engagement therewith, and rises upwardly to a level below the tops of the blocks 73 but well above the tops of the pins 74. Similarly, the space between the border wall 71 and the sides of the blocks 73 adjacent thereto is filled to the same upward level with the relatively soft material 77, so that the pins 74, the insulating material 75, and the bedding 76 are covered thereby. In connection with this construction, it should be pointed out that it is not necessary nor practicable to use in Fig. 5 the insulating material 59 of Fig. 4 for the two reasons that the blocks 73 must not be engaged by hard material and that since the pins 74 are embedded in the grids 68 and 69, there is no need for the further anchorage afforded by the material 59 for the type of shield 52 used in Fig. 4.

Covering the relatively soft insulating material 77 in Fig. 5 between adjacent blocks 73 is a waterproof and relatively elastic sealing compound 78 which may be like the compound 30. The compound 78 terminates upwardly in the plane of the tops of the blocks 73. The border may be covered by a flashing 79 in the same manner that the border 41 in Fig. 4 is covered with the flashing 62. With this flashing construction, the sealing compound 78 covers the insulating material 77 exposed between the upper border portion 65 and the adjacent blocks 73, and terminates upwardly in the plane of the tops of the blocks 73.

Considering the insulating features of the above construction as was done above in considering Figs. 1, 2, 3, and 4, the blocks 73, like the blocks 14, have a low thermal conductivity as compared to that of ordinary single sheets of glass commonly used. The blocks 73 are insulated from the grid members 68 and 69 and the shoulder 72 by the insulating material 75. Adjacent blocks 73 are insulated from each other by the relatively soft material 76, which material also insulates the blocks from the shields 74 and covers the shields, insulating them from the top surface of the construction. The thermal insulation afforded by the upper border portion 65 insulates the lower border portion 66 in the direction of the thickness of the construction and, in cooperation with the insulating material 77, provides a peripheral insulation for the sides of the blocks 73 and the shields 74 considered together. No metal whatever is exposed in the above construction, except the flashing, since the shields 74 are completely concealed. The construction taken as a whole is airtight and watertight and has a thermal conductivity relatively low as compared to that of the glass and metal or glass and concrete constructions used heretofore.

Nothing herein explained is to be interpreted as limiting the various features of the present invention in the scope of its application to use in connection with the particular installations or the particular modes of construction or both selected for the purpose of illustration and explanation. While the particulars of construction herein set forth are well suited to the forms of the invention shown and to the use to which they are put, the present invention is not limited to this use, nor to these details of construction, nor to the conjoint use of all its features, nor is it to be understood that these particulars are essential, since they may be modified within the skill of the artisan without departing from the true scope of the actual invention, characterizing features of which are set forth in the following claims by the intentional use of generic terms and expressions inclusive of various modifications.

What is claimed as new is:

1. A skylight, floorlight, or like construction having, in combination, a framework provided with an aperture, a light transmitting element for the aperture, a shield for the light transmitting element secured to the framework, insulating material surrounding the light transmitting element and covering the shield, and sealing compound surrounding the light transmitting element and overlying the insulating material.

2. A skylight, floorlight, or like construction having, in combination, a framework provided with a plurality of apertures, light transmitting elements for the apertures, shields for the light transmitting elements secured to the framework, insulating material surrounding the light transmitting elements and extending between adjacent elements, said material covering the shields, and sealing compound surrounding the light transmitting elements and overlying the insulating material.

3. A skylight, floorlight, or like construction having, in combination, a peripheral border provided with an inner wall and a portion within the border at a lower level than the top thereof provided with an aperture, a light transmitting element for the aperture, a shield for the light transmitting element secured to the apertured portion spaced from said element and from the border wall, insulating material surrounding the light transmitting element in engagement therewith and with the border wall and covering the shield, and sealing compound surrounding the light transmitting element and overlying the insulating material.

4. A skylight, floorlight, or like construction having, in combination, a peripheral border provided with an inner wall and a portion within the border at a lower level than the top thereof provided with a plurality of apertures, light transmitting elements for the apertures, shields for the light transmitting elements secured to the apertured portion spaced from said elements and from the border wall, insulating material surounding the light transmitting elements, said insulating material covering the shields and extending between adjacent light transmitting elements and between light transmitting elements and the border wall, and sealing compound surrounding the light transmitting elements and overlying the insulating material.

5. A skylight, floorlight, or like construction having, in combination, a framework provided with an aperture, a light transmitting element for the aperture, a shield for the light transmitting element spaced therefrom and secured to the framework, insulating material surrounding the light transmitting element, covering the shield, and filling the space between the shield and the light transmitting element, and sealing compound surrounding the light transmitting element and overlying the insulating material.

6. A skylight, floorlight, or like construction having, in combination, a framework provided with a plurality of apertures, light transmitting elements for the apertures, shields for the light transmitting elements spaced therefrom and secured to the framework, insulating material surrounding the light transmitting elements, said material extending between adjacent light transmitting elements, filling the space between the elements and the shields and covering the latter, and sealing compound surrounding the light transmitting elements and overlying the insulating material.

7. A skylight, floorlight, or like construction having, in combination, a framework provided with an aperture, a light transmitting element for the aperture having a bottom face larger than the aperture so as to overlie the marginal portions of the framework about the aperture, insulating material interposed between the framework and the light transmitting element, bedding interposed between the insulating material and the light transmitting element and engaged with each, a shield for the light transmitting element spaced therefrom and secured to the framework, relatively soft material of low thermal conductivity surrounding the light transmitting element, covering the shield, and filling the space between it and the light transmitting element, and sealing compound surrounding the light transmitting element and overlying the relatively soft material of low thermal conductivity.

8. A skylight, floorlight, or like construction having, in combination, a framework provided with a plurality of apertures, light transmitting elements for the apertures, said elements each having a bottom face larger than the aperture therefor so as to overlie the marginal portions of the framework about the aperture, insulating material interposed between the framework and the light transmitting elements, bedding interposed between the light transmitting elements and the insulating material and engaged with each, shields for the light transmitting elements spaced therefrom and secured to the framework, relatively soft material of low thermal conductivity surrounding the light transmitting elements, said relatively soft material extending between adjacent light transmitting elements, filling the space between the shields and the light transmitting elements, and covering the shields, and sealing compound surrounding the light transmitting elements and overlying the relatively soft material of low thermal conductivity.

9. A skylight, floorlight, or like construction having, in combination, a peripheral border provided with an inner wall and a portion within the border at a lower level than the top thereof provided with an aperture, a light transmitting element for the aperture having a bottom face larger than the aperture so as to overlie the margins of said portion about the aperture, a shield for the light transmitting element spaced therefrom and from the border wall, insulating material surrounding the light transmitting element in engagement therewith and with the border wall and covering the shield, and sealing compound surrounding the light transmitting element and overlying the insulating material.

10. A skylight, floorlight, or like construction having, in combination, a framework comprising a peripheral border provided with an inner wall and a portion within the border at a lower level than the top thereof provided with an aperture, the periphery of said apertured portion comprising a shoulder extending inwardly from the base of said wall, a light transmitting element for the aperture, a shield for the light transmitting element secured to the shoulder, insulating material surrounding the light transmitting element in engagement therewith and with the border wall and covering the shield, and sealing compound surrounding the light transmitting element and overlying the insulating material.

11. A skylight, floorlight, or like construction having, in combination, a framework comprising a peripheral border provided with an inner wall and a portion within the border at a lower level than the top thereof provided with a plurality of apertures, the periphery of said apertured portion comprising a shoulder extending inwardly from the base of said wall, light transmitting elements for the apertures, shields of the light transmitting elements spaced therefrom and secured to the shoulder and to the apertured portion between adjacent apertures, insulating material surrounding the light transmitting elements, said insulating material covering the shields and extending between adjacent light transmitting elements and between light transmitting elements and the border wall, and sealing compound surrounding the light transmitting elements and overlying the insulating material.

12. A skylight, floorlight, or like construction having, in combination, a curbing provided with an inner vertical wall and a shoulder, a metallic grid supported from the shoulder, a grid having low thermal conductivity supported by the metallic grid, the apertures of the second named grid registering with the apertures of the first named grid, light transmitting elements for the apertures, means for insulating the light transmitting elements from each other and also from the grids and the border wall, and sealing compound overlying at least that portion of the insulating means between adjacent light transmitting elements.

13. A skylight, floorlight, or like construction having, in combination, a metallic grid, a grid supported thereby having a low thermal conductivity, the top of said second named grid being at a level above the top of the first named grid and the apertures of the second named grid registering with the apertures of the first named grid, light transmitting elements for said apertures, shields for the light transmitting elements spaced therefrom and secured to the second named grid with their bottoms at a level above the top of the first named grid and with their tops below the tops of the light transmitting elements, insulating material surrounding the light transmitting elements, covering the shields, and overlying the second named grid, and sealing compound surrounding the light transmitting elements and overlying the insulating material.

14. A skylight, floorlight, or like construction having, in combination, a framework comprising a peripheral border provided with an inner wall and a portion within the border at a lower level than the top thereof provided with an aperture, a light transmitting element for the aperture, a shield secured to the framework about the aperture and on which the light transmitting element is supported, the top of said element being at a level above that of the top of the shield, material of low thermal conductivity surrounding the shield in engagement therewith and with the border wall and extending upwardly substantially to the level of the top of the shield, relatively soft material of low thermal conductivity overlying said first named material of low thermal conductivity and extending between the light transmitting element and the border wall, said relatively soft material covering the shield and terminating upwardly at a level below that of the top of the shield, and sealing compound surrounding the light transmitting element and overlying the relatively soft material.

15. A skylight, floorlight, or like construction having, in combination, a framework comprising a peripheral border and a portion of reinforced concrete within the border provided with a plurality of apertures, the border comprising an upper portion of material having low thermal conductivity provided with an inner wall and a lower portion, integral with the apertured portion, of reinforced concrete, the periphery of said apertured portion comprising a shoulder extending inwardly from the base of said wall, light transmitting elements for the apertures, shields for the light transmitting elements spaced therefrom and secured to the shoulder concrete and to the concrete between adjacent apertures, insulating material surrounding the light transmitting elements, said insulating material covering the shields and extending between adjacent light transmitting elements and between light transmitting elements and the border wall, and sealing compound surrounding the light transmitting elements and overlying the insulating material.

16. A skylight, floorlight, or like construction having in combination, a framework provided with an aperture, a light transmitting element of low thermal conductivity for the aperture, means for securing the light transmitting element to the framework, including material having a high thermal conductivity surrounding the light transmitting element and confined to a zone spaced from the exposed face thereof, and a filling of low thermal conductivity surrounding the light transmitting element located at least in a zone interposed between the first-named zone and the exposed face of the light transmitting element.

17. A skylight, floorlight, or like construction having, in combination, a framework provided with an aperture, a light transmitting element of low thermal conductivity for the aperture, means for securing the light transmitting element to the framework, including material, having high thermal conductivity surrounding the light transmitting element and confined to a zone spaced from the exposed face thereof, a sealing compound surrounding the light transmitting element adjacent to the exposed face thereof, and a filling of low thermal conductivity surrounding the light transmitting element and interposed at least between the compound and said zone.

JOSHUA M. RICHARDS.